INVENTOR.
VICTOR E. O. HENNIG

INVENTOR.
VICTOR E.O. HENNIG

United States Patent Office

3,523,997
Patented Aug. 11, 1970

3,523,997
METHOD OF CURING ELONGATED CONCRETE ARTICLES
Victor E. O. Hennig, 131 N. 40th St., Seattle, Wash. 98103
Continuation of application Ser. No. 457,054, May 19, 1965. This application Sept. 23, 1968, Ser. No. 764,029
Int. Cl. F26b 21/02, 21/10
U.S. Cl. 264—345                    2 Claims

ABSTRACT OF THE DISCLOSURE

Trough molds constructed as carts to travel along rails progress from a rigging station at which a core form and prestressed strands are installed, to a pouring station at which the trough is filled with concrete, to an initial setting station at which the core form is removed after initial setting of the concrete has occurred, to a curing station at which the concrete is subjected to steam in an enclosure, to a cooling station where the concrete is cooled, to a stripping station where the sides of the trough are spread to release the molded product which is lifted from the mold trough. The mold trough is then returned to the rigging station to be used again. The core forms are held down by loops engaged with the prestressed strands and the prestressed strands are held down by the fingers of frames anchored to the mold troughs. After concrete is poured into the troughs, the trucks are raised from their wheels by vibrating frames, which vibrate the troughs to consolidate the concrete. Steam is supplied by spraying water into currents of air heated by burners. The sides of the trough frames are spread by moving together legs projecting downward from the trough.

---

This application is a continuation of application Ser. No. 457,054 filed May 19, 1965 which is abandoned.

A principal object of the invention is to manufacture such concrete products by the use of production line technique in which molds are moved progressively from one station to another and preferably step-by-step.

A further object is to provide such an apparatus and method which will minimize handling of the equipment and consequently the labor required in the use of such equipment. At the same time it is an object to minimize the amount of apparatus required for producing such products consistent with expeditious and effective production. Mold forms, for example, can be circulated and reused.

In using the apparatus of the present invention it is an object to isolate molding apparatus from mold-transporting apparatus while a mold is vibrated to compact concrete in it.

A further object is to provide apparatus and a method for expediting setting of the concrete and at the same time to increase the strength of the concrete and promote uniformity of strength of the molded material throughout a particular molded product and from one molded product to another.

An additional object is to provide apparatus enabling a molded product to be released quickly and easily from the mold.

Another object is to provide apparatus having large capacity and which can be utilized for the production of a variety of products with minimum alteration.

In accomplishing such objects the molding apparatus can include a production line which may be defined by a plurality of tracks along which may be moved molds conforming to the particular product to be manufactured. Preferably such molds are in the form of trucks which can roll by gravity from one station to another, the inadvertent movement of which can be prevented by restraining means preferably in the form of chocks. At a rigging station, prestressing strands and lightening bore cores can be installed in the mold. Such mold can then be shifted to a pouring station at which concrete mix is placed in the mold and the mold is vibrated. From such pouring station the mold can be moved to an initial setting station at which parts of the molding apparatus can be removed and slots which they occupied can be filled. From the initial setting station the mold can be moved to a heat-curing station at which the molded product is heated and humidified. From the curing station the mold is moved to a cooling station and then to a stripping station at which the mold and product are separated and the mold is returned to the rigging station while the molded product is moved to a storage station.

At the pouring station the mold truck is moved out of contact with the tracks while the mold is vibrated. At the curing station the mold is in an oven through which moist, hot air is circulated. At the stripping station the mold truck is deformed to withdraw the mold sides from the molded product so that such product can be extracted readily from the mold.

Figure 1:
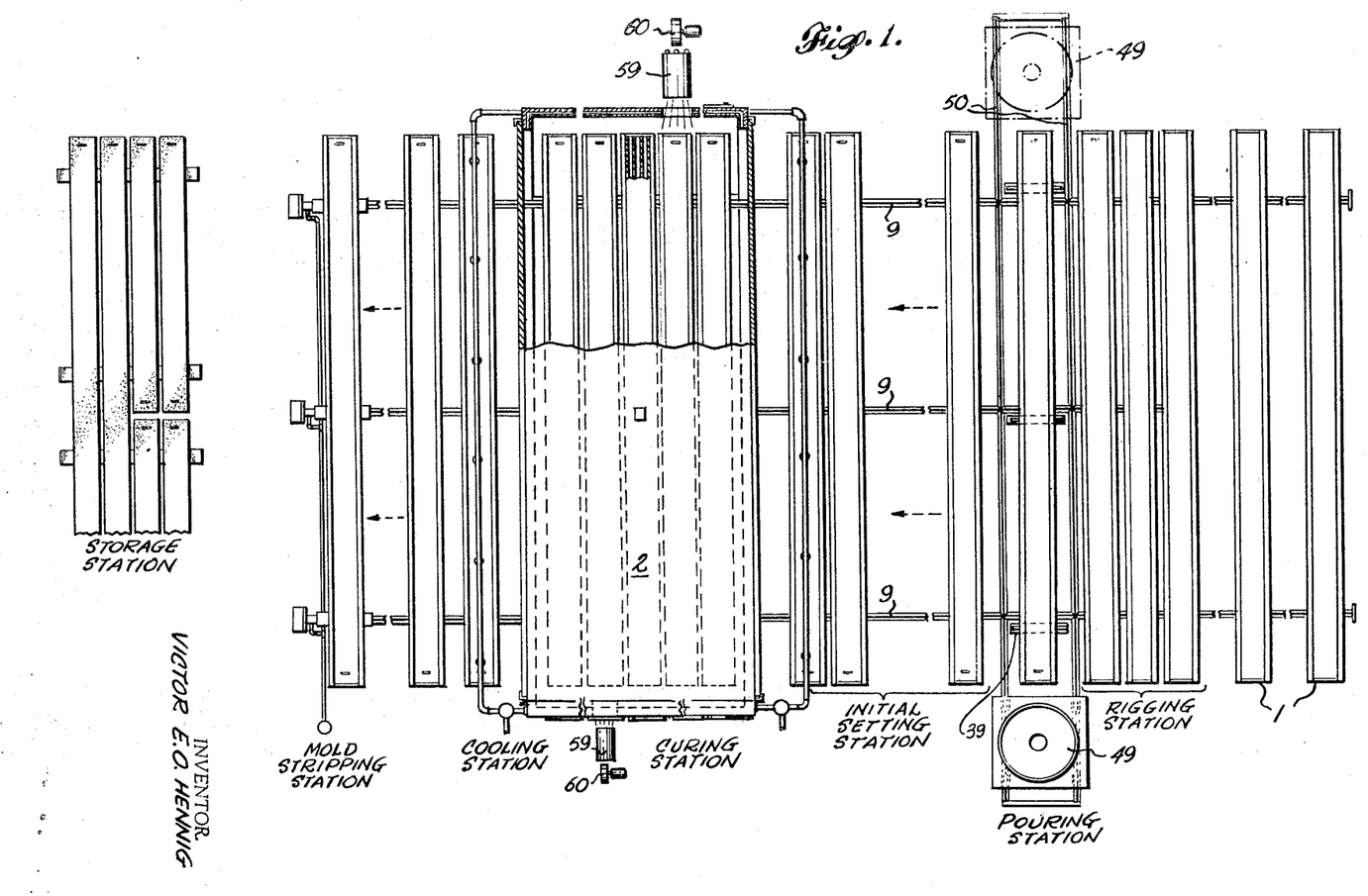
FIG. 1 is a plan of the production line showing the various stations, parts being broken away.
Figure 2:
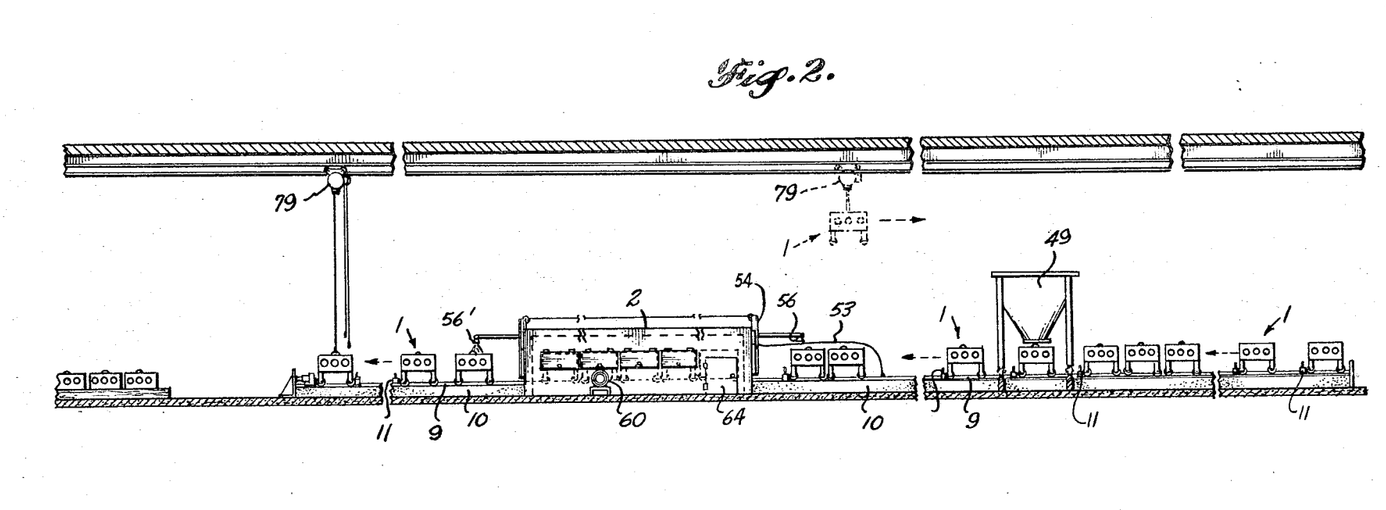
FIG. 2 is an elevation of such production line.

For the purpose of illustrating a desirable use for the apparatus of this invention such apparatus, as shown in the drawings, includes molds 1 of channel shape in which prestressed concrete planks having longitudinal lightening bores can be molded. At the rigging station such molds are suitably rigged for use and then moved to the left, as seen in FIGS. 1 and 2, to the pouring station. From the pouring station the filled molds are moved to the initial setting station, at which the aperture-forming portions of the molding apparatus can be removed from the molds. The molds are moved from the initial setting station into the oven 2 constituting the curing station. After the concrete has set sufficiently in the oven it is moved to the cooling station where the set molded product is cooled by water sprays. Form the cooling station the mold is shifted to the mold-stripping station where the molded product is removed from the mold and transferred to the storage station while the mold is returned to a location at the extreme right of FIGS. 1 and 2 ahead of the rigging station for reuse.

Figures 3, 4, 5:
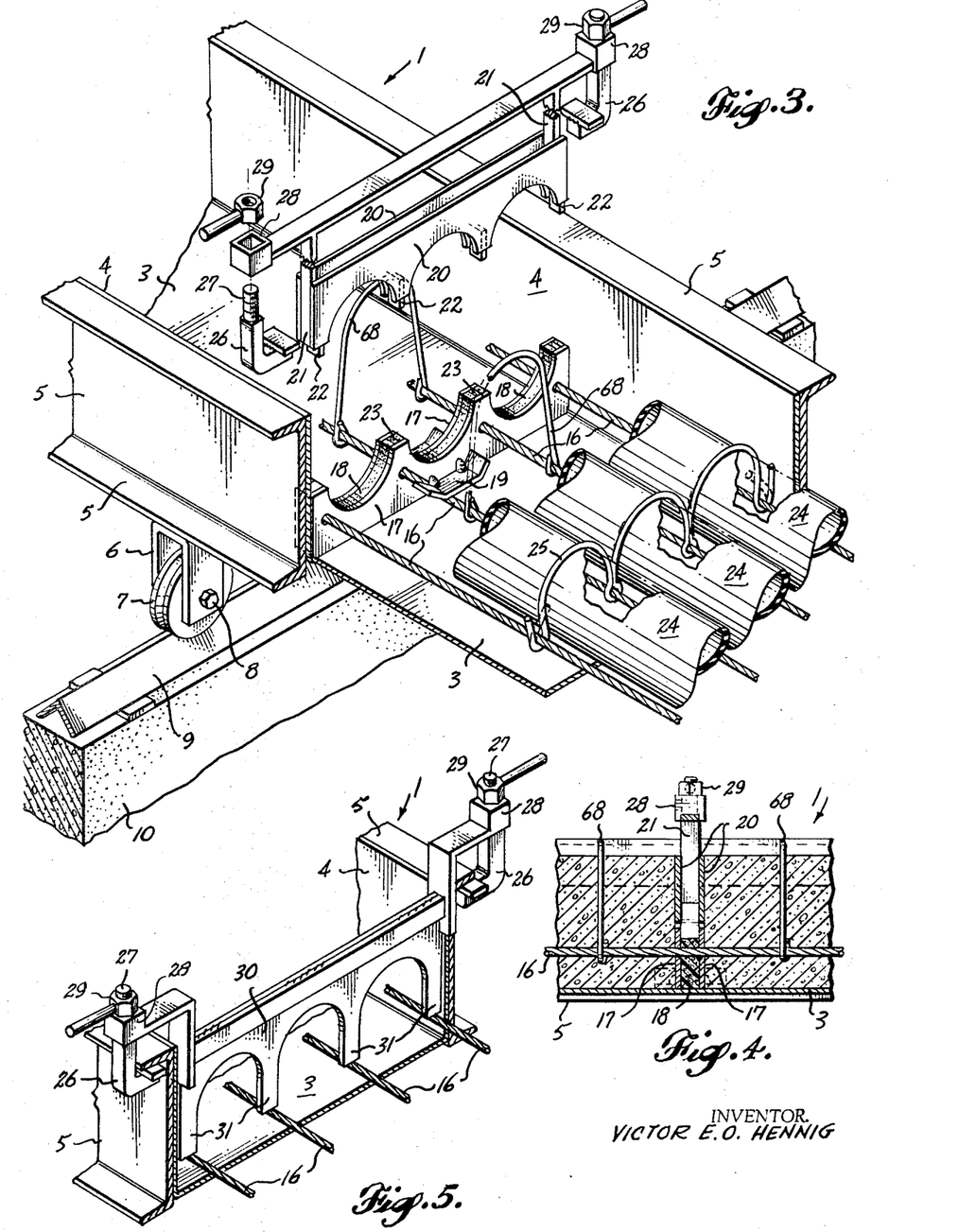
FIG. 3 is a top perspective of a central portion of a mold form truck, parts being broken away and parts being shown in exploded relationship.
FIG. 4 is a longitudinal section through a portion of such molding apparatus.
FIG. 5 is a fragmentary top perspective of another portion of the molding apparatus.

The condition of the mold at the rigging station is shown best in FIGS. 3 and 5 for molding concrete planks which may, for example, be 2 feet wide, 40 feet long and from 4 inches to 12 inches in thickness. The mold 1 is in the form of a trough having a bottom 3 and opposite sides 4. These sides are reinforced by structural channels 5 which may be welded to the trough sides 4. To the bottom flanges of such channels are welded legs 6 shown in the form of yokes straddling wheels 7 which rotate on axles 8. Such wheels have grooved peripheries which fit tracks 9, indicated as being formed of angle irons. Such tracks are mounted on bases 10 so that they slope gradually from the right ends of FIGS. 1 and 2 from station to station to the left ends. The trucks will therefore roll by gravity from the initial end to the terminal end of the production line.

Figures 6, 7, 8:
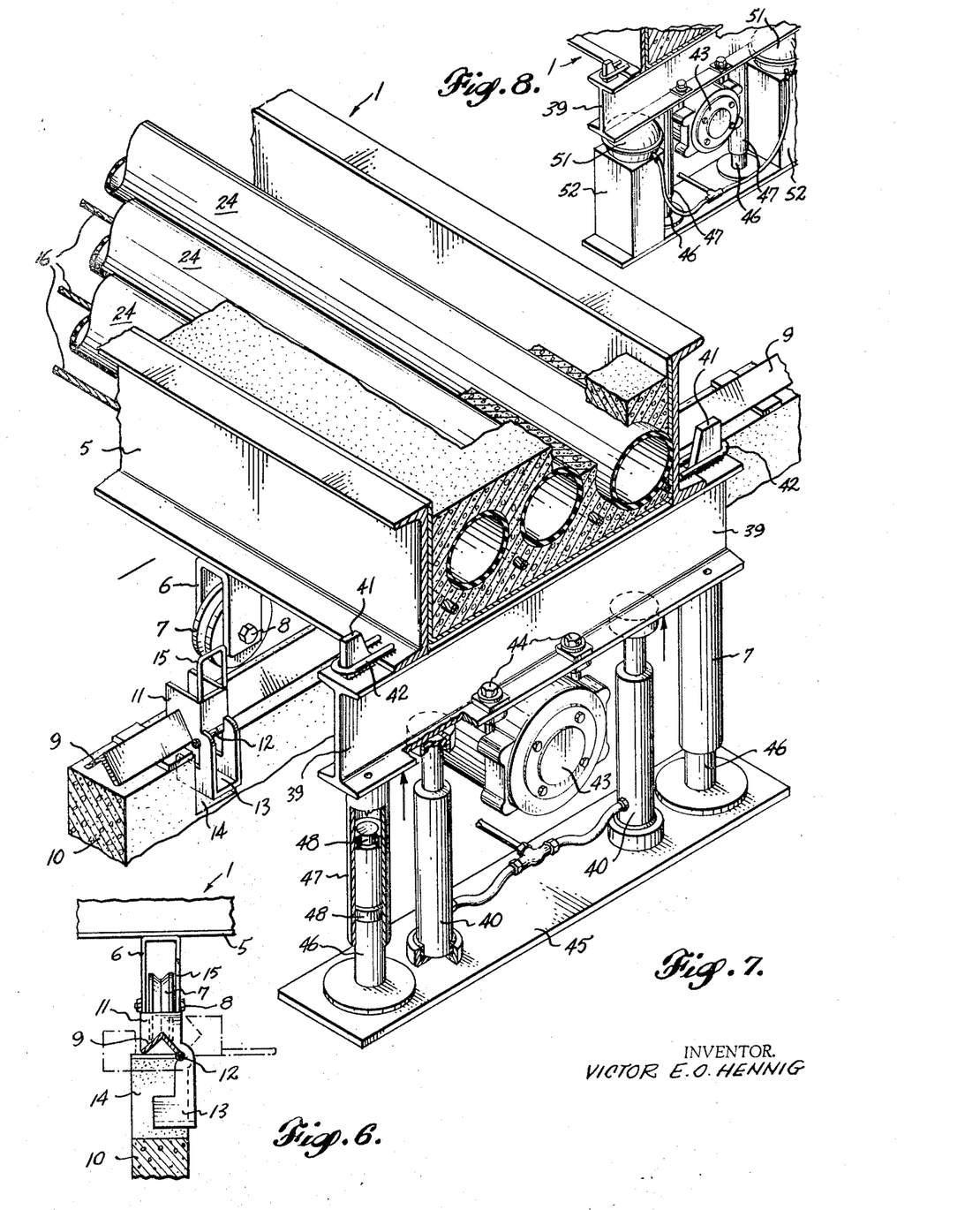
FIG. 6 is a fragmentary transverse section showing wheel chock construction.
FIG. 7 is a top perspective of a portion of the molding apparatus at the pouring station having parts broken away.
FIG. 8 is a fragmentary top perspective of the same portion of the apparatus showing an alternative type of construction.

The mold truck can be retained at the rigging station by a chock 11 swingably mounted on a pivot 12 so that it can be swung aside into the broken-line position of FIG. 6 from the solid-line wheel-blocking position of that figure. A counterweight 13 is attached to the chock 11 at the opposite side of pivot 12 and such counterweight can swing through the notch 14 in the track base 10. The chock can be swung from the solid-line blocking position shown in FIG. 6 into the broken-line released position by a workman grasping the handle 15 and swinging the chock and counterweight around the pivot 12. When the pull on the handle is released the counterweight will swing the chock back up into the solid-line wheel-blocking position again.

At the rigging station the prestressing strands 16 are placed longitudinally in the trough mold 1. These strands may extend through a central partition including a lower section composed of scalloped plates 17, shown in FIGS. 3 and 4. Such plates are spaced apart slightly longitudinally of the mold and the space between these plates is filled with easily removable material 18 having a low melting point, such as foamed styrene plastic material. A lug 19 is loosely supported on each plate 17 at its side opposite the other plate.

The upper section of this partition is composed of oppositely scalloped plates 20 supported by bars 21 spaced apart the same distance as the plates 17. Legs 22 also are secured between the plates 20 in positions to fit into slots 23 in complemental, upwardly projecting portions of the lower partition section. When the two partition sections are fitted together with the legs 22 in the sockets 23, oppositely disposed concave portions of the edges of plates 17 and 20 will form apertures closely embracing core-forming tubes 24 extending longitudinally of the trough form between adjacent strands 16, respectively. Such core forms can be of rubber material of cylindrical shape so that they can be expanded in cross section, to some extent, by inflation.

Because of the air in the tubes 24 they will tend to float upward in the trough mold 1 as it is filled with concrete mix. In order to prevent such flotation of the core tubes they may be held down by a stiff wire yoke 25 having arches engaging the upper sides of the tubes 24 and intermediate bends or loops crimped on the strands 16. The opposite ends of this yoke can be bent along opposite sides of the yoke into clamping engagement with the two strands at opposite sides of the trough, respectively, to prevent the yoke from tipping over. The central portions of the core tubes 24 will, of course, be held down by the plates 20 of the upper divider section. Such upper divider section in turn can be held down in the form by lugs 26 of angle shape having one leg end engaging beneath the upper flange of a side channel 5 of the form and having a threaded end 27 on its other leg extending up through a socket 28 on the corresponding end of the upper divider section, and secured by a nut 29 screwed onto such threaded end.

While the central portions of the prestressing strands 16 are held in place by passing through the plates 17 of the lower divider section, as shown in FIG. 3, it may be desirable to provide additional hold-down means between the central divider and the trough form ends for the purpose of holding the strands 16 down in the trough mold against the lifting force exerted on such strands by the core tubes 24 through the connecting yokes 25. For this purpose any number of hold-down frames 30 can be provided along the lengths of the strands 16, as shown in FIG. 5. Such frames have legs 31 projecting downward into engagement with the strands when such frames are held in proper position by the clamping lugs 26. Such lugs are of the same type as used to hold the upper section of the divider frame in position including threaded ends 27 projecting through the sockets 28 and secured by nuts 29. The lower ends of such lugs can be engaged beneath the upper flanges of the channels 5, as shown in this figure.

Figure 9:
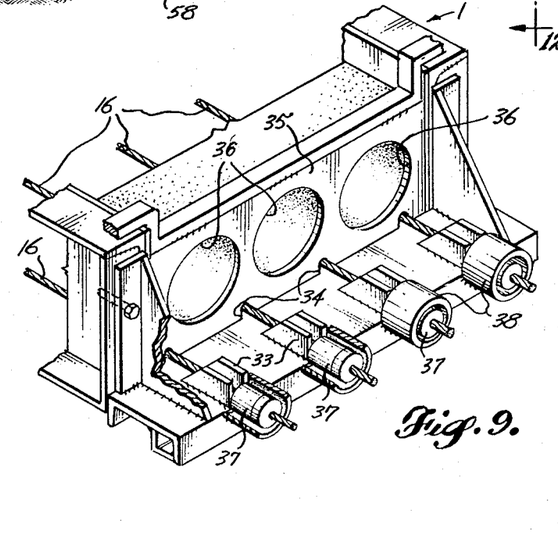
FIG. 9 is a top perspective of an end portion of a mold form with parts broken away.
Figure 10:
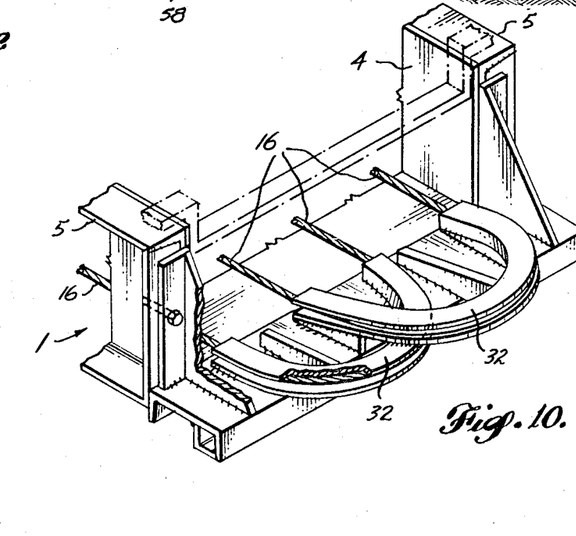
FIG. 10 is a top perspective of the opposite end portion of such a mold form, also having parts broken away.

The strands 16 are tensioned prior to pouring of the concrete mixture by the apparatus shown in FIGS. 9 and 10. While four stretches of strand are shown extending longitudinally through the mold trough 1 it is preferred that such stretches be formed by only two strands so that each strand forms two of such stretches. As shown in FIG. 10 two stretches of strand at opposite sides of a third stretch are interconnected by a strand section which forms a return bend and is lodged in the external groove of a U-shaped strand guide 32. Two of such guides are shown in overlapping relationship and they are anchored to one end of the mold-supporting structure.

At the opposite end of the mold trough the ends of the strand stretches 16 are lodged in grooves 33 located in positions corresponding to notches 34 in the lower portion of the mold end plate 35. Such mold end plate has in it apertures 36 through which the expandable core tubes 24 can extend. The end plate 35 is held in position by clamping lugs and nuts of the type shown in FIGS. 3 and 5 as lugs 26, 27, sockets 28 and nuts 29. The strands 16 are tensioned by jacks and the tension is retained by strand vises 37 applied to the strands engaging the ends of grooves 33. Such vises are received within housings 38 secured to the mold ends.

After the mold has been rigged in the manner described the chock is removed from its wheel-blocking position by a workman pulling on lever 15 to swing the chock out of its position above the track, and the mold is then rolled down the tracks 9 to the pouring station shown in FIGS. 1 and 7. At this station a wheel chock 11 stops the truck in proper relation to lifting bars 39 which will be disposed beneath the truck at locations adjacent to the three rails 9, respectively. Such lifting bars can be raised by jacks 40, shown in FIG. 7, so that ears 41 projecting upwardly from the bar 39 in each instance will be projected into loops 42 welded to the opposite channel sides 5 of the trough mold, respectively. Alternatively, sections of the rails could be lowered so that the mold would engage stationary supporting bars and the rails would be withdrawn from the wheels.

The jacks 40 should lift the bar 39 high enough so that the wheels 7 will clear the tracks 9 sufficiently to prevent transmission of any vibration from the wheels to the tracks when the mold containing concrete is vibrated. Vibration of the trough mold can be effected by the motor 43 having an unbalanced rotor, which motor is secured by U-bolts 44 to a bar 39. During vibration of the mold the loops 42 embracing the ears 41 will prevent the mold 1 from being shifted out of registry with the lifting bars 39. To prevent each lifting bar from being shifted relative to a base 45 without placing undesirable side loads on the jacks 40, locators are provided including telescoping devices having shock-absorbing elements interposed between them. Thus, an inner pipe 46 is disposed in telescoping arrangement with an outer pipe 47. Collars 48 of resiliently yieldable material such as rubber are fitted in grooves spaced lengthwise of the inner tubular members 46 and project beyond the surfaces of such members so as to engage the inner wall of the outer tubular member 47, to hold the telescoping members in spaced relationship. Vibration of the lifting bar 39 and the outer tubular members 47 can then shift such tubular members relative to the inner tubular members 46 to a limited degree with the vibration being absorbed by the collars 48.

When a mold 1 at the pouring station has been raised off the tracks 9, in the manner described, the trough mold can be filled with relatively dry concrete mix from a dispensing hopper 49, as shown in FIG. 1, so as to have low slump characteristics and high strength when set. Such hopper is supported on a mobile truck running on horizontal tracks 50 extending transversely of the tracks 9 along which the hopper runs in depositing concrete. The speed of flow of the concrete mix from the hopper relative to the speed of travel of the hopper along the tracks 50 can be regulated so that the mold 1 can be filled half full of mix as the hopper moves in one direction along the tracks 50 and the balance of the mix can be deposited in the mold as the hopper returns to its starting position. If the vibrating motor 43 is operated during such depositing of the concrete mix, the mix will be vibrated into place almost by the time the pouring operation has been completed.

As soon as the mold 1 has been filled with concrete and it has been vibrated sufficiently, the upper surface of the mold can be smoothed. It should be noted that even though the tracks 9 slope the trough mold bottom will be level because the mold-supporting bars 39 will be level. Also, the legs 6 on the downhill side of the mold can be made slightly longer than the legs on the uphill side of the mold so that the mold bottom will be maintained exactly horizontal at all times. The jacks 40 can then be operated to lower the bars 39 for setting the mold trucks onto tracks 9 again. The chock 11 at the pouring station can now be swung out of the path of the truck wheels so that the truck can be rolled out of the pouring station preparatory to the next truck being moved into such station.

In FIG. 8 an alternative type of lifting mechanism is shown in which inflatable bags or pillows 51 are mounted on pedestals 52 adjacent to opposite ends of the lifting bar 39 which can be inflated to lift such bar. In this instance, as described in connection with FIG. 7, the vibrating motor 43 is suspended from the lifting bar. Instead of the stabilizing columns 46, 47 being located beneath the opposite ends of the lifting bar, however, such columns are located inward from the lifting bar ends at opposite sides of the vibrating motor and between such motor and the pedestals 52. The inflatable bags 51 can be made of fabric-reinforced rubber or plastic material, and are inflated by air so as to provide a shock-absorbing action between the lifting bar 39 and the pedestals 52. Such lifting bags can withstand the vibration of the mold much more readily than the jacks 40 even if opposite ends of the jacks have rubber mountings.

Figure 11:
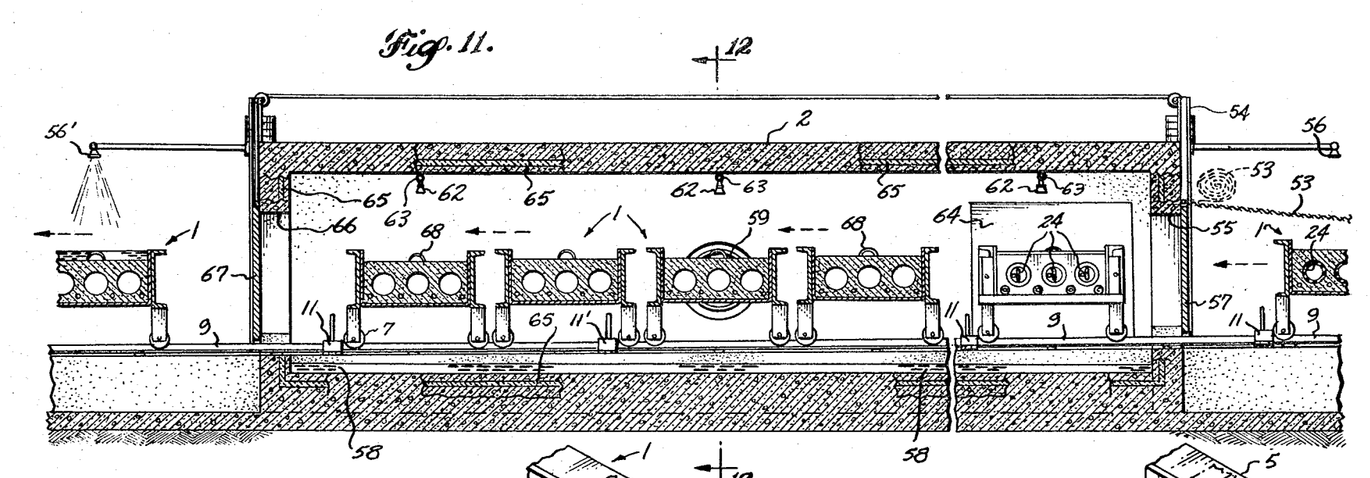
FIG. 11 is a longitudinal section through molding apparatus at the curing station and FIG. 12 is a transverse section through such apparatus taken on line 12—12 of FIG. 11.

After the mold 1 has been filled with concrete mix it is desirable for the strand hold-down members 30 to be removed and the grooves formed by them filled with concrete mix before the concrete has set appreciably. Consequently, when the mold truck has been rolled from the pouring station, indicated in FIG. 1, to the initial setting station such hold-down members are removed, the resulting grooves are filled with concrete mix, and the upper surface of the mold at such locations is troweled smooth. It may be desirable to allow the mold to set at this location long enough so that the core forms 24 can be withdrawn or, alternatively, such core forms can be withdrawn shortly after the mold has been moved inside the curing oven. Particularly in cold weather it may be desirable to protect the filled molds and to prewarm them while they are at the initial setting station. For this purpose a canopy 53 can be arranged with one edge attached to the entering end wall 54 of the curing oven above the opening 55 and such canopy can drape down to the rails 9, as shown in FIGS. 2 and 11.

Alternatively, during hot weather it may be desirable to dampen and cool the molds at the initial setting station to retard initial setting of the concrete. Under such conditions the canopy 53 will be rolled up above the doorway 55, as shown at the right of FIG. 11, and suspended in such rolled condition by suitable loops. One or more sets of water spray heads 56 can be arranged in suitable locations over the initial setting station from which water can be sprayed intermittently or continuously onto the molds to provide water which can be evaporated to cool the molds. When space is available in the curing oven 2 the wheel chock 11 is tilted away from wheel-blocking position so that the truck can be rolled into the oven. To provide access to the oven the vertical sliding door 57, closing the opening 55, will be raised.

The curing oven 2 can be of a size to receive any desired number of mold trucks, depending upon the capacity of the production line desired. Such oven should be capable of accommodating at least several trucks arranged in side-by-side relationship, as shown in FIG. 11, with the planks on the several trucks forming a layer so as to enable proper uniformity of cure to be obtained economically. The atmosphere within the curing oven is very humid, as well as being at an elevated temperature. Humidity may be provided by including in the bottom of the oven evaporation pools 58 of water from which air heated by blowers 60, blown into opposite ends of the oven, can evaporate water. In addition, the hot air supplied by one or both of the blowers can be humidified directly, such as by water sprayed into the current of hot air discharged from the blower 60 through the heater 59. The coil 61 can be placed in the current of hot air for preheating and a spray from one of such coils, which is perforated, will supply the water to the current of hot air.

Figure 12:
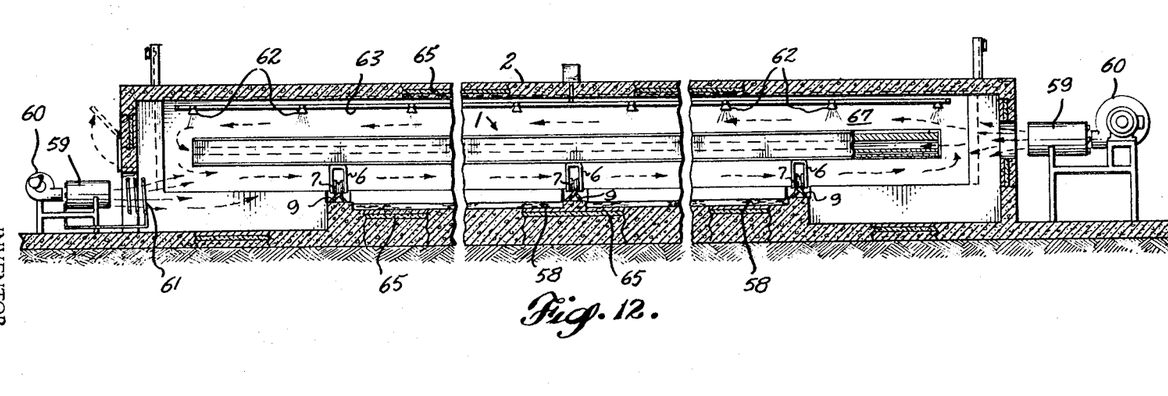

If further humidification of the air or molds is desired sprays 62 can be provided in the roof of the oven, to which water is supplied by spray pipes 63. As shown best in FIG. 1, the heaters 59 and blowers 60 at opposite ends of the oven are offset in opposite directions from the vertical center plane of the oven transversely of the directions of flow of the air streams projected by the blowers so that each blower blows a current of air along a path without a current of air opposing it. Also, the blower and heater at one end of the oven, such as that at the left end, as shown in FIG. 12, can be placed at an elevation below that of the blower and heater at the right end of the oven as seen in that figure. Such horizontally and vertically offset locations of the blowers and heaters blowing heated air or heated humidified air along paths generally parallel to the length of the elongated molded planks and adjacent to them, as indicated by the flow lines in FIGS. 1 and 12, will produce a rotary or circulatory movement of the air through the oven so as to afford more uniform engagement of the air with all parts of the molds.

It is desirable for the hollow cores 24 to be deflated and withdrawn from the molds at least shortly after the molds have entered the oven, such as at the extreme right position of the mold truck within the oven, as indicated in FIG. 11. A door 64 can be provided in the end of the oven in registry with such a mold location for the purpose of enabling the mold cores to be withdrawn from a mold in this position. At least one of the blowers 60 and heaters 59, shown as the blower and heater at the right of FIG. 12, should then be disposed at an elevation such that the heated air current can blow through the plank bores formed by such cores for the purpose of providing curing, heating and humidification both internally and externally of the mold. As shown in FIG. 12, such blower blows a current of air through the bores entering one end without such current being opposed by a current of air being blown in the opposite direction into the other ends of the bores.

It has been found that curing the molds in an oven expedites greatly the setting time of the concrete mixture. The temperature of the products will increase gradually as they move through the oven to a temperature exceeding approximately 135° F. and at substantially atmospheric pressure, so that at the discharge side of the oven the temperature of the mold may have increased to a value of 160° F. to 185° F. By the time the cured product is discharged from the oven, curing of the molded product in the oven may have advanced sufficiently far so that the plank can be removed from the mold in a curing time within the oven of approximately four hours for a plank 24 inches wide, 8 inches thick and 40 feet long. The heat of the oven is conserved by providing insulation layers 65 in the roofs and walls and floor of the oven, which may be of foamed styrene material.

The first mold truck in the oven can be held in position by a chock 11 adjacent to the discharge end of the oven 2 and another chock 11' holds the rest of the trucks which run against each other and the first chock-held truck, as shown in FIG. 11. Chock 11 must be swung out of blocking position in order to enable one truck to be removed from the oven through the opening 66, which is closed by the vertically sliding door 67, while the other trucks continue to be held in the oven by the chock 11'. The trucks emerge from the oven to the cooling station shown in FIG. 1, above which cooling sprays 56' are mounted from which water can be sprayed onto the molded products to cool them to atmospheric temperature more quickly than they would cool in the atmosphere alone. When the molded product has achieved sufficient strength so that it can be handled without damage as a result of the setting which occurs at the initial setting station, the curing station and the cooling station, the truck can be moved to the mold-stripping station shown in FIGS. 1, 13, 14 and 15.

Figures 13, 14, 15:
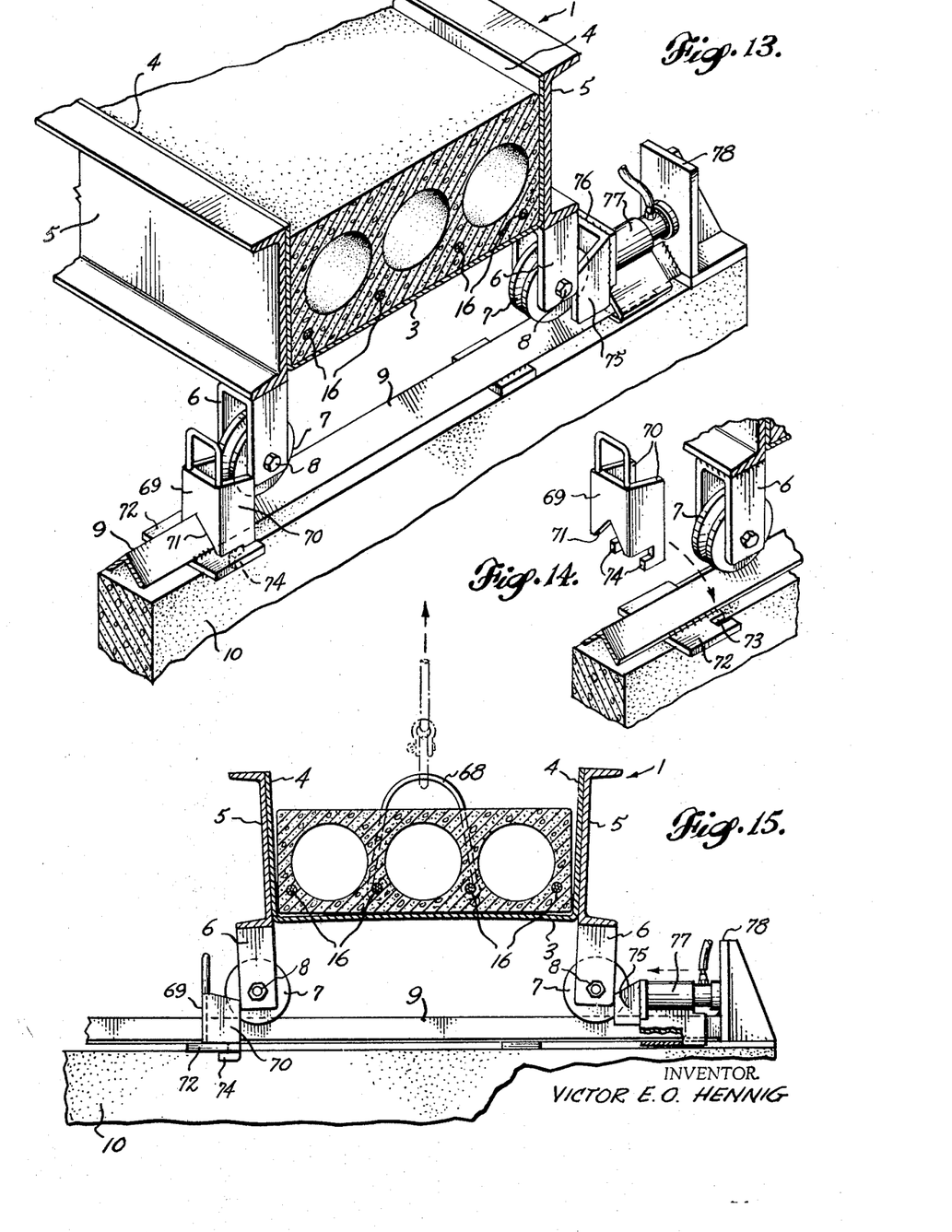
FIG. 13 is a top perspective of a portion of a mold at the stripping station in conjunction with associated apparatus.
FIG. 14 is a top perspective of a portion of such apparatus with parts in a different relationship.
FIG. 15 is a transverse section through the mold and associated apparatus at the stripping station with parts broken away.

In rigging the mold, lifting loops 68 can be located adjacent to opposite ends of the mold with their ends curled around the strands 16 near the center, as shown in FIGS. 3 and 15. When the concrete of the plank has set, the legs of the loops 68 will be embedded firmly in the concrete so that the entire weight of the plank can be supported by engagement with such loops. The plank can therefore be removed from the trough mold 1 by applying a suitable lifting force to such loops when the molded plank has been freed from the mold. In order to free the planks from the mold it is desirable to separate the mold sides 4 from the sides of the plank and to loosen the mold bottom 3 from the bottom of the plank, at least to some extent. This result is achieved by deforming the mold in the manner indicated by FIGS. 13, 14 and 15, Before the molded plank can be lifted from the mold it is necessary to free such plank from the mold in various ways. As has been mentioned above, the hold-down plates 30 have been removed from the molded product at the initial setting station. It is desirable to remove the upper section 20, 20 of the central divider, although this is not essential. In addition, it is desirable to remove the end plates 35, after which a gas or electric cutting torch can be applied to the strands 16 adjacent to the mold ends so as to release the strands from the vises 37 and the grooves 33.

In FIG. 14 the details of a wheel chock are shown, which chock is illustrated in use in FIGS. 13 and 15. The chock 69 is of channel shape and the distance between its flanges 70 is such that the wheel 7 can be received between such flanges. The web of the chock has in it a V-shaped notch 71 complemental to the shape of the rail 9. A plate 72 beneath the rail has notches 73 at its opposite sides which may be engaged by hooks 74 on the lower end of the chock. Such hooks engage the plate to prevent the chock from being overturned by the pressure of a leg 6 against the chock when the hooks are engaged with the plate. Actually, the wheel does not engage the inner surface of the chock web, but the lower ends of the wheel yoke 6 bear against the flanges 70.

In order to release the set concrete plank from the mold such mold is sprung, or buckled, by pressing the lower ends of the yoke legs 6 toward each other so that they serve as levers tiltable about the opposite edges of the trough mold base 3 as fulcrums. Pressure may be applied to the lower end of one of the legs 6 by the flanges 75 of a channel-shaped head 76 on a jack 77. Such jack is fluid operated and may be of pneumatic or hydraulic type. This jack bears against an abutment 78 at the end of each track 9.

When fluid under pressure is admitted to the jacks 77 the jack heads 76 are moved toward the chocks 69, as shown in FIG. 15, to tilt the leg yokes 6 for moving the upper portions of the mold sides 4 away from each other and for simultaneously buckling the bottom 3 of the trough mold into an upwardly convex contour. By the oppositely tilting movement of the mold sides their upper portions are withdrawn from the molded plank affording ample draft for release of the plank. The buckling of the bottom 3 strips most of the mold bottom from the plank face. Consequently, by application of lifting force to the loops 68 the finished plank can be hoisted from the mold and transferred to the storage station shown at the extreme left of FIG. 1. The mold can then be cleaned, the pressure in jacks 77 can be relieved and the mold can then be transported by the bridge crane 79 back to the beginning of the production line for reuse.

If it is desired to cut the concrete plank into two lengths a gas or electric cutting torch can be applied to the insulating material 18 between the two plates 17 at the center of the cast plank, as shown in FIG. 3. The foamed styrene will melt readily and rapidly, and the cutting torch can then be applied to sever the strands 16 between such plates. The adjacent ends of the two halves of the molded plank will thus be severed. In the completed planks the prestressed strands 16 will, of course, provide the tensile strength required in the lower portion of the plank to give it great beam strength.

While the manufacture of a concrete plank has been described, the same general type of apparatus and procedure can be used to manufacture products of other types such as wall panels, beams, joists and columns which may, or may not, have in them lightening bores.

What is claimed is:

1. The method of curing a molded concrete article elongated such that its length is at least several times as great as its greatest dimension transversely of its length, having a substantially rectangular external profile in cross section and having a bore extending longitudinally through the length of such article, which comprises placing in an enclosure a mold containing such a concrete article and blowing a first current of humid heated air over and closely adjacent to an exterior surface of the article without a fluid current opposing such first air current, and blowing a second current of humid heated air separate from the first air current through such article bore in only one direction without a fluid current opposing such second air current, such first air current and such second air current being offset both horizontally and elevationally from each other transversely of their lengths, and thereby simultaneously dynamically directly heating and humidifying opposite interior and exterior portions of the article throughout its length and thus accelerating curing from opposite sides of that portion of the concrete article between such first and second air currents.

2. The method defined in claim 1, in which the enclosure is of little height and the mold is located so that the upper surface of the article is spaced downward from but disposed adjacent to the roof of the enclosure and the bottom of the mold is spaced upward from but disposed adjacent to the bottom of the enclosure, the currents of humid heated air are blown generally horizontally in opposite directions, respectively, and closely adjacent to opposite exterior horizontal sides of the article, respectively, and at least one of such air currents is blown partially into one end of such bore of the article.

References Cited

UNITED STATES PATENTS

| | | | |
|---|---|---|---|
| 1,689,082 | 10/1928 | Rhoads | 34—204 X |
| 2,481,130 | 9/1949 | Lindemuth | 34—105 |
| 2,618,075 | 11/1952 | Everhart | 34—105 |
| 3,091,833 | 6/1963 | Kovach | 25—142 |

FOREIGN PATENTS 1,101,524 10/1955 France.

ROBERT F. WHITE, Primary Examiner

K. J. HOVET, Assistant Examiner

U.S. Cl. X.R.

25—133, 142; 34—223; 263—53